United States Patent [19]

Witucki

[11] Patent Number: 5,426,168

[45] Date of Patent: Jun. 20, 1995

[54] METHOD OF PREPARING AN ORGANICALLY-MODIFIED, HEAT-CURABLE SILICONE RESIN AND THE RESIN PRODUCED THEREBY

[75] Inventor: Gerald L. Witucki, Midland, Mich.

[73] Assignee: Dow Corning Corporation, Midland, Mich.

[21] Appl. No.: 235,771

[22] Filed: Apr. 29, 1994

[51] Int. Cl.⁶ .............................................. C08G 77/08
[52] U.S. Cl. ........................................ 528/23; 528/29; 428/447; 524/588; 524/858
[58] Field of Search ................... 528/29, 23; 524/588, 524/858; 428/447

[56] References Cited

U.S. PATENT DOCUMENTS

| | | | |
|---|---|---|---|
| 2,441,066 | 5/1948 | Hanford | 528/29 |
| 3,600,418 | 8/1971 | Bailey et al. | 528/29 |
| 4,408,031 | 10/1983 | Holtschmidt et al. | 528/26 |
| 4,501,872 | 2/1985 | Chang et al. | 528/18 |
| 4,749,764 | 6/1988 | Koerner et al. | 528/15 |

OTHER PUBLICATIONS

Kendrick et al., *Polymerization of Siloxanes*, (1989) pp. 479–480.
Letter from Goldschmidt Chemical to Dow Corning, Feb. 23, 1990.
Silikophen P80/X (label).

*Primary Examiner*—John C. Bleutge
*Assistant Examiner*—Margaret W. Glass
*Attorney, Agent, or Firm*—Arne R. Jarnholm

[57] ABSTRACT

A novel method for preparing an organically-modified, heat-curable silicone resin and the novel resin produced thereby are disclosed. In the method of the invention, a trialkoxysilane, a difunctional diorganosilicon compound, a polyol and a catalytic amount of an acidic cationic siloxane polymerization catalyst are reacted to substantial equilibrium to form an alkoxy-functional product. Substantially all the hydrolyzable alkoxy groups of the alkoxy-functional product are then hydrolyzed and the catalyst inactivated. The product is stripped of water and alcohol and may be diluted with a polar solvent such as xylene to the desired viscosity. The heat-cured resin product obtained in accordance with the invention has superior hardness, flexibility and solvent and impact resistance.

14 Claims, No Drawings

METHOD OF PREPARING AN ORGANICALLY-MODIFIED, HEAT-CURABLE SILICONE RESIN AND THE RESIN PRODUCED THEREBY

BACKGROUND OF THE INVENTION

1. Field of the Invention

The present invention relates generally to the field of heat-curable silicone resins, and more particularly to a novel method for preparing organically-modified types of such resin, which method yields a cured product that has superior physical properties.

2. Description of the Prior Art

Heat-curable silicone resins are often incorporated into coating systems, such as high temperature and maintenance paints and release coatings for culinary utensils. The heat-curable resins are used to impart the coating systems with numerous properties including heat stability, weatherability and the maintenance of gloss and adhesion. Of particular importance are the properties of hardness, impact resistance, flexibility and solvent resistance.

One such heat-curable silicone resin and a process for preparing the same are disclosed in Koerner et al., U.S. Pat. No. 4,749,764, assigned to Th. Goldschmidt AG, Germany. Koerner et al. teach a process wherein low molecular weight multifunctional alcohols are reacted with siloxanes of the general formula:

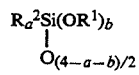

in which
OR$^1$ is an alkoxy group of a primary or secondary aliphatic alcohol with 1 to 4 carbon atoms,
R$^2$ is an alkyl and or phenyl group,
a has a value of 1.0 to 1.5 and
b has a value of 0.1 to 0.7.

The reaction is carried out at a temperature between about 100° C. and 160° C., and may incorporate the use of known transesterification catalysts.

Koerner et al. teach using multifunctional alcohols (polyols) in such a quantity that there is approximately a one-to-one correspondence between the COH groups of the polyol and the OR$^1$ alkoxy groups of the siloxane. The COH groups of the polyol react at the OR$^1$ sites of the alkoxy siloxane, forming an Si—O—C bond and releasing HOR$^1$ alcohol. The HOR$^1$ alcohol so-generated is removed until 25% to 80% of the alkoxy groups in the siloxane have been reacted.

The present inventor has investigated the physical properties of prior art cured resins, which, upon information and belief, were prepared in accordance with the teachings of Koerner et al. It was found that the cured resins exhibited some of the aforementioned physical properties to a reasonably useful level. However, it has also been found that the heat-cured compositions prepared in accordance with the present invention exhibit far superior physical properties.

A particular drawback associated with prior art resins, including those of Koerner et al., is the inability of such coatings to provide a combination of high hardness, flexibility and impact resistance. It is well-known in the field of material science that the properties of flexibility and impact resistance are generally sacrificed at the expense of hardness. In other word, hard materials often behave in a brittle manner. Resins made in accordance with the present invention, however, achieve the surprising result of exhibiting both high hardness in combination with flexibility and impact resistance.

Without limiting the present invention, it is theorized that the novel method of the invention results in a cured product having a novel chemical structure. It is believed that the method of the invention results in silicone/organic block copolymers that have a lower polydispersity and a more random structure than resins produced in accordance with the prior art. It is further theorized that the lower polydispersity and more random structure give rise to the improved physical properties associated with the cured resins of the present invention.

BRIEF SUMMARY OF THE INVENTION

In accordance with the present invention there is provided a novel method for preparing an organically-modified, heat-curable silicone resin, which novel method imparts the cured resin with superior physical properties. The method of the invention comprises the steps of:

(1) reacting, essentially to equilibrium:
(a) a trialkoxysilane of the general formula

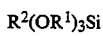

wherein
each OR$^1$ is independently selected from the group consisting of alkoxy groups having 1 to 4 carbon atoms, and
each R$^2$ is independently selected from the group consisting of aryl and alkyl groups;
(b) a difunctional diorganosilicon compound; and
(c) at least one polyol; in the presence of
(d) a catalytic amount of an acidic cationic siloxane polymerization catalyst
to form an alkoxy-functional product therefrom;

(2) hydrolyzing substantially all the hydrolyzable alkoxy groups in the alkoxy-functional product obtained in step (1) by adding a predetermined amount of water thereto;

(3) inactivating the acidic cationic siloxane polymerization catalyst in the hydrolyzed product;

(4) and thereafter stripping water and alcohol R$^1$OH therefrom.

The novel method of the invention results in a unique organically-modified, heat-curable silicone resin composition and heat-cured resin composition. In particular, the heat-cured resin composition of the present invention exhibits far superior hardness, flexibility and solvent resistance than similar such resins prepared in accordance with prior art methods.

The novel method of the invention may optionally include the addition of (e) a source of triorganosilyl endblocker radicals of the general formula R$^3{}_3$Si— wherein each R$^3$ is a hydrocarbon radical having 1 to 6 carbon atoms, to components (a) through (d) in the reacting step (1). The triorganosilyl endblocker may be used to control the degree of crosslinking in and therefore the molecular weight of the final heat-curable resin product.

It is therefore an object of the present invention to provide a method of preparing an organically-modified, heat-curable resin which, upon curing exhibits superior hardness, flexibility and solvent resistance.

It is a feature of the present invention that the heat-curable resin of the present invention may be combined with various pigments to produce high temperature paints.

These and other objects and features of the invention will be understood by those skilled in the art from the following Detailed Description of the Invention and Claims, including several examples of the invention and a comparison of those examples to prior art resins.

DETAILED DESCRIPTION OF THE INVENTION

In accordance with the invention there is provided a novel method of producing an organically-modified, heat-curable silicone resin composition. The novel method of the invention produces a novel resin composition which, upon curing, exhibits superior hardness, flexibility and solvent resistance. The method of the invention comprises the steps of: (1) reacting, essentially to equilibrium, (a) a trialkoxysilane, (b) a difunctional diorganosilicon compound, and (c) at least one polyol in the presence of (d) a catalytic amount of an acidic cationic siloxane polymerization catalyst to form an alkoxy-functional product therefrom; (2) hydrolyzing substantially all the hydrolyzable alkoxy groups of the alkoxy-functional product obtained in step (1); (3) inactivating (d) the acidic cationic siloxane polymerization catalyst; and (4) thereafter stripping water and $R^1OH$ alcohol therefrom.

It will be understood by those skilled in the art that the terms "equilibrium" and "equilibrating," as applied to chemical reactions, denote a theoretical dynamic state that is never completely reached in actual practice. As used herein, then, these terms mean that a reaction is carried out to substantial equilibrium.

In the prior art method of preparing an organically-modified, heat curable silicone resin (namely, in accordance with Koerner et al.) a polyol is reacted with an alkoxysiloxane. The relative amounts of polyol and alkoxysiloxane are selected such that the number of carbinol groups (COH) on the polyol and the number of $OR^1$ alkoxy groups on the alkoxysiloxane are approximately in a one-to-one correspondence. The reaction is terminated at a 25% to 80% degree of conversion.

In the present invention, components (a) through (d) are all reacted essentially to equilibrium, before carrying out an hydrolysis step to form a siloxane. The relative amounts of polyol and trialkoxysilane are selected such that the correspondence between the number of carbinol (COH) groups on the polyol and the number of $OR^1$ alkoxy groups on the trialkoxysilane is substantially less than one-to-one. Only after the equilibration step (1) are the remaining alkoxy groups hydrolyzed so that the three dimensional siloxane resin structure arises.

The trialkoxysilane (a) has a general formula $R^2(OR^1)_3Si$ wherein each $OR^1$ is independently selected from the group consisting of alkoxy groups having 1 to 4 carbon atoms and each $R^2$ is independently selected from the group consisting of aryl and alkyl groups. Preferred trialkoxysilanes are phenyltrialkoxysilanes and more particularly preferred is phenyltrimethoxysilane. The presence of the phenyl groups in the silane contributes to the thermal stability and oxidation resistance of the cured resin. The use methoxysilanes is preferred because they are easily hydrolyzed and the methanol generated during hydrolysis is easily stripped.

The difunctional diorganosilicon compound (b) utilized in the present invention forms linear polymer links in the final resin structure. As used herein the term "difunctional diorganosilicon compound" means a compound having a chemical formula that includes at least one silicon atom, two organic radicals bonded to each silicon atom and two reactive or functional groups which render the compound capable of polymerizing to form a linear siloxane in the presence of an acidic cationic siloxane polymerization catalyst, which catalyst is described in further detail hereinbelow.

Accordingly, the term "difunctional diorganosilicon compound" includes diorganodialkoxysilanes which, in the presence of the aforementioned catalyst, can be hydrolyzed to form linear diorganosiloxanes.

The term "difunctional diorganosilicon compound" also includes silanol-terminated diorganosiloxanes and, in particular, silanol-terminated dimethylsiloxanes. It is known in the art that such silanol-terminated diorganosiloxanes are readily obtained by heating diorganocyclosiloxanes in the presence of the aforementioned catalyst. Particularly preferred for the present invention are dimethylcyclosiloxanes including three to six silicon atoms in their structure.

Component (c) is designated simply as a polyol. As used herein, the term "polyol" means any organic compound having two or more reactive COH groups in its structure. Polyols that are preferred for the present invention include ethylene glycol, trimethylolethane, trimethylolpropane, neopentyl glycol, glycerin, pentaerythritol and dimethylolcyclohexane.

Component (d) is an acidic cationic siloxane polymerization catalyst. Such catalysts are well-known in the art for making high molecular weight siloxane polymers from cyclosiloxanes and relatively short-chained linear polydimethylsiloxanes. Acidic cationic siloxane polymerization catalysts include strong protonic acids such as $H_2SO_4$, or $HClO_4$ and a variety of Lewis Acids. Also included are supported catalysts such as $H_2SO_4$-treated montmorillonite clay. Especially preferred in the present invention is the use of strong sulfonic acids such as trifluoromethane sulfonic acid.

In the equilibration step (1) there may optionally be added component (e) a source of triorganosilyl endblocker having a radical of the formula $R^3_3Si-$ wherein each $R^3$ is a hydrocarbon radical having 1 to 6 carbon atoms. $R^3$ is, for example, a methyl, ethyl, propyl, phenyl or vinyl group. The source of the triorganosilyl endblocker radicals can be any material which, under the reaction conditions of step (1), forms the triorganosilyl radical of the formula $R^3_3Si-$. A preferred source is hexamethyldisiloxane, which readily yields up the trimethylsilyl endblocker in the presence of the acidic cationic siloxane polymerization catalyst. The triorganosilyl endblocker is used to control the degree of crosslinking in (and therefore the molecular weight of) the final resin product.

Component (d), the acidic cationic siloxane polymerization catalyst, performs several roles in step (1) of 5 the invention, the equilibration reaction. When a cyclosiloxane is used as a source for the difunctional diorganosilicon compound, component (b), the catalyst (d) opens the ring structure of the cyclosiloxane, rendering a silanol-terminated linear siloxane. When a triorganosilyl-terminated linear polydiorganosiloxane is used as a source of component (b), the catalyst cleaves the molecule and forms a linear silanol-terminated diorganosiloxane as well as liberating triorganosilyl endblocker radicals, optional component (e). Likewise, the catalyst (d) causes the generation of triorganosilyl endblocker radicals from specific endblocker sources, such as hexamethyldisiloxane and hexamethyldisilazane.

In addition to the role outlined above, the catalyst (d) performs another vital function during the equilibration step (1) in that it acts as a transesterification catalyst for the reaction of the COH groups on the polyol with the $OR^1$ alkoxy groups on the trialkoxysilane, (a), thus aiding the formation of the Si—O—C bond therebetween.

After the equilibration step (1), the catalyst (d) performs one additional function. In step (2), substantially all the hydrolyzable alkoxy groups in the equilibrated alkoxy-functional product obtained from step (1) are hydrolyzed. The catalyst (d) also works to promote this hydrolysis step. With the addition of water, the catalyst-aided hydrolysis causes polymerization, thus forming the organically-modified, heat-curable siloxane resin network. The hydrolysis step (2) of the alkoxy-functional product obtained from step (1) also yields $R^1OH$ alcohol.

It will be recognized by those skilled in the art that the hydrolysis of alkoxy groups associated with alkoxysilanes and alkoxysiloxanes is rarely, if ever, complete. That is to say, certain of the alkoxy groups are very readily hydrolyzed under the reaction conditions described herein. Other alkoxy groups, depending upon their location in the silane or siloxane structure and the degree of polymerization of the structure, will not hydrolyze under the described reaction conditions. Accordingly, as used herein, the phrase "hydrolyzing substantially all the hydrolyzable groups in the alkoxy-functional product" in connection with step (2) means that sufficient water is added to the system to permit substantially complete hydrolysis of those alkoxy groups that are hydrolyzable under the reaction conditions described in connection with the method of the invention.

It will be further understood by those skilled in the art that the amount of water added to complete the hydrolysis step (2) must, at a minimum, meet that required by stoichiometry and reaction conditions. It will be recognized, however, that water in excess of that required to complete the hydrolysis step (2) is still within the scope of the invention and will not adversely affect the resin produced thereby except to necessitate its removal during stripping, step (4).

After the hydrolysis step (2), the acidic cationic siloxane polymerization catalyst (d) is inactivated by known means such as the introduction of an appropriate amount of calcium carbonate.

In the preferred embodiment of the invention, the amount of components (a), (b) and (c), relative to one another, used in the preparation of the heat-curable resin are varied such that a desirable balance of the physical properties is obtained in the heat-cured product. The present inventors have found that a wide range of usable coating compositions are obtained if the following quantities of materials are used in formulating the heat-curable resin: between about 35 and 75 parts, by weight, of trialkoxysilane (a); between about 3 and 35 parts, by weight, of difunctional diorganosilicon compound (b); and between about 0.5 and 50 parts, by weight, of polyol (c), relative to the combined weights of (a), (b) and (c). Even more preferred are the ranges of: between about 50 and 70 parts, by weight, of trialkoxysilane (a); between about 4 and 20 parts, by weight, of difunctional diorganosilicon compound (b); and between about 2 and 15 parts, by weight, of polyol (c).

Measurement of Physical Properties

The physical properties of hardness, flexibility, impact resistance and solvent resistance of heat-cured resins produced in accordance with the invention and the prior art were measured and compared. In addition, the same properties were measured and compared in paint formulations which independently incorporated the heat-curable resins of the invention and prior art. The tests used to measure each of the properties are explained in detail, below.

Each of the tests utilized a $3 \times 6$ inch ($7.52 \times 15.24$ cm) test panel of 20 mil (0.051 mm) thick cold-rolled steel. The test panel was coated with a heat-curable resin or a paint formulation incorporating the same, using a drawdown bar to insure a coating of uniform thickness. The coating was thereafter cured with the application of heat, in the manner hereinafter noted.

Hardness

Hardness of the cured resins and paint formulations was measured using ASTM D3363, which is incorporated herein by reference. ASTM D3363 rates coating hardness by attempting to scratch the surface of a coated substrate with drafting pencils of increasing lead hardness. Coating hardness is rated as the highest lead hardness that cannot scratch through the coating. Pencil hardness testing can be carried out at elevated temperatures as well as room temperature.

Flexibility and Impact Resistance

Flexibility and Impact Resistance were measured using the Gardner Reverse Impact Test in accordance with ASTM D2794, which is incorporated herein by reference. A coated test panel was placed on a flat base (coated side down) over a 1.5 cm diameter hemispherical depression formed in the base. A 1.8 kg shaft, having a 1.3 cm diameter hemispherical tip, was aligned over the hemispherical depression and raised a predetermined distance over the coated panel. The shaft was then dropped onto the test panel, causing deformation. The coated surface was visually inspected for crazing. The greatest height from which the shaft can be dropped without inducing crazing of the coating is a measure of the flexibility and impact resistance of the coating composition. The results are generally reported in the minimum inch-pounds (kg-meters) required to produce cracking in the coating.

Solvent Resistance

The solvent resistance of the cured coating compositions and paint formulations was measured using a "double rub" test, in accordance with ASTM D5402 which incorporated herein by reference.

In the "double rub" test, cold-rolled steel test panels, having a cured resin coating or paint formulation (prepared in accordance with the procedure described below) were laid on a flat surface. Eight layers of cheesecloth were secured about the ball end of a 24 oz. (681 g) ball peen hammer. The cheesecloth was then saturated with a solvent, such as methylethylketone, and the ball end of the hammer brought to rest on the coated surface with the handle held horizontally. The handle was moved back and forth, in a direction perpendicular to the direction of drawdown, without the application of downward pressure on the hammer. A single forward and reverse stroke was counted as one "double rub." The double rubbing action was repeated until a breakthrough to metal was noted at the surface, disregarding the positions adjacent the stroke ends. The number of "double rubs" the coating or paint formulation of a given thickness can withstand before the breakthrough of metal is a measure of its solvent resistance.

EXAMPLE 1 OF THE INVENTION

An organically-modified, heat-curable resin of the present invention was prepared in accordance with the procedure described below. No difference was noted in the physical properties of the cured resin product when the heat-curable resin was produced in batch sizes ranging from 1 kg and 200 kg.

The following materials were used in the corresponding weight percents, which weight percents are based upon the total weight of materials used in the process, regardless whether the material acts in the capacity of a catalyst or is later stripped off.

| Material | Weight Percent |
|---|---|
| (a) phenyltrimethoxysilane | 55.1 |
| (b) dimethylcyclosiloxanes* | 7.7 |
| (c) trimethylolpropane | 4.8 |
| (c) ethylene glycol | 1.1 |
| (d) trifluoromethane sulfonic acid | 0.03 |
| (e) hexamethyldisiloxane | 2.5 |
| deionized water | 7.5 |
| calcium carbonate | 0.04 |
| zinc octoate | 0.04 |
| tetrabutyltitanate | 0.04 |
| xylene | 17.0 |
| isobutyl alcohol | 4.2 |

*(This is a blend of dimethylcyclosiloxanes comprising about 0.1 parts of hexamethylcyclotrisiloxane, 96 parts octamethylcyclotetrasiloxane and 4 parts decamethylcyclopentasiloxane, by weight.

In accordance with the invention, components (a) through (e) were charged into a glass-lined reaction vessel which had been purged with nitrogen. The components were then heated to 70° C. and held at temperature for four hours, thereby reacting substantially to equilibrium, step (1). The alkoxy-functional product obtained in step (1) was allowed to cool to about 50° C. and the deionized water was added thereto, thus initiating hydrolysis, step (2).

The addition of water to the alkoxy-functional product obtained in step (1) is highly exothermic. The internal vessel temperature was allowed to reach reflux temperature (about 68° C.) and held at reflux conditions for one hour.

After allowing the hydrolyzed product to cool to about 50° C., step (3), inactivation of the acidic cationic siloxane polymerization catalyst, was carried out by adding calcium carbonate in an amount sufficient to neutralize the trifluoromethane sulfonic acid (d). The product was stirred for thirty minutes to insure neutralization of the catalyst (d).

Step (4), stripping the composition of water and methanol, was carried out by atmospheric stripping to about 110° C. and thereafter vacuum stripping.

After stripping, the contents of the vessel were allowed to cool to about 50° C. and the zinc octoate, tetrabutyltitanate and xylene were added. The zinc octoate and tetrabutyltitanate are optional catalysts known in the art to promote condensation of an hydrolyzed alkoxy-functional product. Xylene was added to obtain a final product that is about 70 weight percent solids.

Finally, the isobutyl alcohol was added to promote clarity of the final heat-curable resin product.

COMPARATIVE EXAMPLE

In order to compare the organically-modified heat-curable siloxane resins of the present invention with those of the prior art, a sample of an organically-modified, heat-curable silicone resin, designated as Silikophen P80/X, was obtained from Tego Chemie Service USA, a division of Goldschmidt Chemical Corp. P.O. Box 1299, 914 E. Randolph Road, Hopewell, Va. 23860. Upon information and belief, the Silikophen P80 X was made in accordance with the teachings of Koerner et al. The resin was diluted in solvent and contained 80.2 weight percent solids.

Paint Formulations

The heat-curable resin of Example 1 and the Comparative Example were used to prepare three different paint formulations: medium gloss white; low gloss black; and aluminum.

In each of the paint formulations, the pigment and resin solids were considered as constituting the total solids for the paint. The resin and pigment mixtures were diluted with xylene until the viscosity permitted the drainage of a #4 Zahn cup in 30 seconds. The paint formulations were then applied to the test panels with a 4 mil (0.1 mm) drawdown and cured for 30 minutes at 450° F. (232° C.) in an oven. The cured paint formulations were then tested for solvent resistance and hot hardness.

Medium Gloss White

The medium gloss white paint formulation included the following solids: 45 parts resin solids; 45 parts titania (0.35 $\mu$m median particle size); and 10 parts mica ($1 \times 10$–20 $\mu$m mean particle size), all by weight.

| | Properties | |
|---|---|---|
| | Example 1 | Comparative Example |
| Total Solids | 80.3% | 81.5% |
| Paint thickness, mils (mm) | 1.3 (0.033) | 1.3 (0.033) |
| Solvent Resistance Double Rubs | | |
| Methylethylketone | 180 | 5 |
| Hot Hardness at: | | |
| 200° F. (93.3° C.) | 2B | >6B |
| 300° F. (149° C.) | 3B | — |
| 400° F. (204° C.) | 5B | — |
| 500° F. (260° C.) | >6B | — |

Low Gloss Black

The low gloss black paint formulation included the following solids: 53.8 parts resin solids; 16.3 (calcined Mn/Cu/Fe coprecipitated compound, 0.40 $\mu$m mean particle size); 22.7 parts mica ($1 \times 10$–20 $\mu$m mean particle size); and 7.2 parts fumed silica (6.0 $\mu$m mean particle size), all by weight.

| | Properties | |
|---|---|---|
| | Example 1 | Comparative Example |
| Total Solids | 62.9% | 61.2% |
| Paint thickness, mils (mm) | 1.2 (0.03) | 1.2 (0.03) |
| Solvent Resistance Double Rubs | | |
| Methylethylketone | 20 | 20 |
| Toluene | 30 | 14 |
| Mineral Spirits | 200+ | 200+ |
| Hardness, | B | B |

| Properties | | |
|---|---|---|
| | Example 1 | Comparative Example |
| ambient temp. | | |

Aluminum

The aluminum paint formulation included the following solids: 50 parts resin solids; and 50 parts aluminum paste (65 weight percent aluminum particles, 99% less than 0.044 mm), all by weight.

| Properties | | |
|---|---|---|
| | Example 1 | Comparative Example |
| Total Solids | 52.8% | 48.8% |
| Paint thickness, mils (mm) | 1.1 | 1.1 |
| Solvent Resistance Double Rubs | | |
| Methylethylketone | 75 | 20 |
| Toluene | 110 | 50 |
| Mineral Spirits | 200+ | 200+ |
| Hardness, ambient temp. | 2H | 2H |

From the foregoing data it is readily apparent that paint formulations that utilize the heat-curable resin of the invention, exhibit solvent resistance and hardness that is at least as good as or superior to that exhibited by the same formulation incorporating the heat-curable resin of the prior art.

EXAMPLES 2 AND 3 OF THE INVENTION

Examples 2 and 3 of the present invention were prepared in accordance with the procedure described in connection with Example 1, excepting differences as a result of formulation. The materials that were utilized are set forth below.

| | Example 2 Weight Percent | Example 3 Weight Percent |
|---|---|---|
| (a) phenyltrimethoxysilane | 62.0 | 64.7 |
| (a) methyltrimethoxysilane | 4.5 | 3.1 |
| (b) dimethylcyclosiloxanes* | 5.5 | 5.0 |
| (c) trimethylolpropane | 8.6 | 8.4 |
| (c) ethylene glycol | 2.0 | 1.9 |
| (d) trifluoromethane sulfonic acid | 0.03 | 0.03 |
| (e) hexamethyldisiloxane | 1.8 | 0.0 |
| deionized water | 8.4 | 8.8 |
| calcium carbonate | 0.03 | 0.03 |
| zinc octoate | 0.0 | 0.0 |
| tetrabutyltitanate | 0.0 | 0.0 |
| xylene | 3.5 | 3.5 |
| isobutyl alcohol | 0.0 | 0.0 |

Properties

Samples of the heat-curable resins of Examples 2 and 3 of the invention and the Comparative Example (at about 80 weight percent solids in xylene) were coated over the previously described test panels using a 5 mil (0.127 mm) drawdown. The coated panels were cured at 600° F. (316° C.) for 10 minutes. The cured panels were then tested for hardness, solvent resistance and flexibility and impact resistance, as reported below.

| | Comparative Example | Example 2 | Example 3 |
|---|---|---|---|
| Solvent Resistance Double Rubs | | | |
| Methylethylketone | 30 | 500 | 160 |
| Hardness ambient temp. | 2B | 2H | 2H |
| Gardner Reverse Impact inch-lbs. (kg-meters) | <1 (<0.012) | 4 (0.46) | 2 (0.23) |

It should be noted that Examples 2 and 3 of the invention utilized no source of triorganosilyl endblocker radicals, component (e), in their preparation. Even so, the physical properties of the heat-cured resin of the invention are far superior to those of the prior art. The above data show that the heat-cured silicone resins of the invention represent a substantial improvement in providing coating compositions that are hard, flexible and resistant to impact and solvent attack.

It will be appreciated by those skilled in the art that a novel method of preparing an organically-modified, heat-curable silicone resin and a novel resin produced by the aforementioned method, including examples, advantages and features thereof, have been described. Such examples, advantages and features have been included for the purpose of illustrating the invention but shall not be construed as limiting the same, the scope of the present invention being defined only by the appended claims and equivalents thereof.

That which is claimed:

1. A method of preparing an organically-modified, heat-curable silicone resin comprising the steps of:
    (1) reacting, essentially to equilibrium:
        (a) a trialkoxysilane of the general formula $R^2(OR^1)_3Si$ wherein
            each $OR^1$ is independently selected from the group consisting of alkoxy groups having 1 to 4 carbon atoms, and
            each $R^2$ is independently selected from the group consisting of aryl and alkyl groups;
        (b) a difunctional diorganosilicon compound; and
        (c) at least one polyol;
    in the presence of
        (d) a catalytic amount of an acidic cationic siloxane polymerization catalyst
    to form an alkoxy-functional product therefrom;
    (2) hydrolyzing substantially all the hydrolyzable alkoxy groups in the alkoxy-functional product obtained in step (1) by adding a predetermined amount of water thereto;
    (3) inactivating the acidic cationic siloxane polymerization catalyst in the hydrolyzed product;
    (4) and thereafter stripping water and alcohol $R^1OH$ from the product.

2. A method in accordance with claim 1 wherein said polyol is selected from the group consisting of ethylene glycol, trimethylolethane, trimethylolpropane, neopentyl glycol, glycerin, pentaerythritol and dimethylolcyclohexane.

3. A method in accordance with claim 1 wherein there is included (e) a source of triorganosilyl endblocker radicals of the general formula $R^3_3Si$— wherein each $R^3$ is a hydrocarbon radical having 1 to 6 carbon atoms in said step (1).

4. A method in accordance with claim 1 wherein said predetermined amount of water is in excess of the amount necessary to hydrolyze substantially all the hydrolyzable alkoxy groups in said alkoxy-functional product.

5. A method in accordance with claim (1) wherein said acidic cationic siloxane polymerization catalyst (d) is trifluormethane sulfonic acid.

6. A method in accordance with claim 1 wherein said difunctional diorganosilicon compound (b) is obtained by said acidic cationic siloxane polymerization catalyst (d) acting on a diorganocyclosiloxane.

7. A method in accordance with claim 1 wherein said trialkoxysilane is phenyltrimethoxysilane.

8. A method in accordance with claim 1 further comprising the step of (5) adding a condensation-promoting catalyst after said stripping step (4).

9. A method in accordance with claim 1 wherein: the amount of (a), said trialkoxysilane, is between about 35 and 75 parts, by weight; the amount of (b), said difunctional diorganosilicon compound, is between about 3 and 35 parts, by weight; and the amount of (c), said polyol, is between about 0.5 and 50 parts, by weight, relative to the combined weights of components (a), (b) and (c).

10. A method in accordance with claim 9 wherein: the amount of (a), said trialkoxysilane, is between about 50 and 70 parts, by weight; the amount of (b), said difunctional diorganosilicon compound, is between about 4 and 20 parts, by weight; and the amount of (c), said polyol, is between about 2 and 15 parts, by weight, relative to the combined weights of components (a) through (c).

11. A heat-curable, organically-modified silicone resin produced by the method of claim 1.

12. A method of preparing a cured organically-modified silicone resin comprising the steps of:
(1) reacting, essentially to equilibrium:
 (a) a trialkoxysilane of the general formula $$R^2(OR^1)_3Si$$

wherein
 each $OR^1$ is independently selected from the group consisting of alkoxy groups having 1 to 4 carbon atoms, and
 each $R^2$ is independently selected from the group consisting of aryl and alkyl groups;
 (b) a difunctional diorganosilicon compound; and
 (c) at least one polyol;
in the presence of
 (d) a catalytic amount of an acidic cationic siloxane polymerization catalyst
to form an alkoxy-functional product therefrom;
(2) hydrolyzing substantially all the hydrolyzable alkoxy groups in the alkoxy-functional product obtained in step (1) by adding a predetermined amount of water thereto;
(3) inactivating the acidic cationic siloxane polymerization catalyst in the hydrolyzed product;
(4) stripping water and alcohol $R^1OH$ from the hydrolyzed product; and
(5) curing the product by heating.

13. An article of manufacture comprising a cured organically-modified silicone resin produced by the method of claim 12 on a substrate.

14. A paint formulation comprising, in combination, an organically-modified, heat-curable silicone resin produced by the method of claim 1 in combination with pigment.

* * * * *